United States Patent
Sundaresan et al.

(10) Patent No.: US 11,632,239 B2
(45) Date of Patent: *Apr. 18, 2023

(54) SYSTEM AND METHOD FOR BLOCKCHAIN-BASED DEVICE AUTHENTICATION BASED ON A CRYPTOGRAPHIC CHALLENGE

(71) Applicant: Workday, Inc., Pleasanton, CA (US)

(72) Inventors: Prakash Sundaresan, Redmond, WA (US); Lionello G. Lunesu, Peng Chau (HK); Antoine Cote, Sheung Wan (HK)

(73) Assignee: Workday, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,190

(22) Filed: Apr. 12, 2022

(65) Prior Publication Data
US 2022/0239467 A1 Jul. 28, 2022

Related U.S. Application Data

(63) Continuation of application No. 16/879,606, filed on May 20, 2020, now Pat. No. 11,336,432, which is a
(Continued)

(51) Int. Cl.
*H04L 9/06* (2006.01)
*H04L 9/14* (2006.01)
(Continued)

(52) U.S. Cl.
CPC .............. *H04L 9/0637* (2013.01); *H04L 9/14* (2013.01); *H04L 9/30* (2013.01); *H04L 9/3226* (2013.01);
(Continued)

(58) Field of Classification Search
CPC ... H04L 9/0637; H04L 9/3247; H04L 9/3271; H04L 9/3265
See application file for complete search history.

(56) References Cited

U.S. PATENT DOCUMENTS

| 6,950,948 B2 | 9/2005 | Neff |
| 7,360,094 B2 | 4/2008 | Neff |

(Continued)

FOREIGN PATENT DOCUMENTS

| GB | 2539430 | 7/2015 |

OTHER PUBLICATIONS

Andreas M. Antonopoulos, "Mastering Bitcoin Programming the Open Blockchain", Jun. 1, 2017, O'Reilly, 2nd Edition, Chapter 5 (Year: 2017).

(Continued)

*Primary Examiner* — Ellen Tran
(74) *Attorney, Agent, or Firm* — Van Pelt, Yi & James LLP

(57) ABSTRACT

A system for blockchain-based authentication comprises an interface and a processor configured to (i) receive, by a first device, a command from a second device, where the first device is associated with a first trust certificate, (ii) receive a second trust certificate from the second device, (iii) communicate a cryptographic challenge using a public key of the second device to the second device, (iv) receive a response to the cryptographic challenge from the second device, (v) check whether the response matches with a predetermined correct response or not, and (vi) authenticate the second device and execute the commend received from the second device only if the response matches with the predetermined correct response.

15 Claims, 6 Drawing Sheets

Related U.S. Application Data continuation of application No. 15/973,479, filed on May 7, 2018, now Pat. No. 10,715,312, which is a continuation-in-part of application No. 15/662,417, filed on Jul. 28, 2017, now Pat. No. 10,637,665, said application No. 15/973,479 is a continuation-in-part of application No. 15/961,791, filed on Apr. 24, 2018, now Pat. No. 10,735,197, which is a continuation-in-part of application No. 15/662,417, filed on Jul. 28, 2017, now Pat. No. 10,637,665.

(60) Provisional application No. 62/368,875, filed on Jul. 29, 2016, provisional application No. 62/489,772, filed on Apr. 25, 2017, provisional application No. 62/368,875, filed on Jul. 29, 2016, provisional application No. 62/489,772, filed on Apr. 25, 2017, provisional application No. 62/503,107, filed on May 8, 2017.

(51) Int. Cl.
 H04L 9/30 (2006.01)
 H04L 9/32 (2006.01)
 H04L 9/00 (2022.01)

(52) U.S. Cl.
 CPC .......... H04L 9/3239 (2013.01); H04L 9/3247 (2013.01); H04L 9/3265 (2013.01); H04L 9/3271 (2013.01); H04L 9/50 (2022.05)

(56) References Cited

U.S. PATENT DOCUMENTS

| | | |
|---|---|---|
| 9,397,980 B1 | 7/2016 | Chen |
| 2002/0077887 A1 | 6/2002 | London Shrader |
| 2004/0236693 A1 | 11/2004 | Quesselaire |
| 2008/0010449 A1 | 1/2008 | Holtzman |
| 2010/0138652 A1 | 6/2010 | Sela |
| 2013/0096943 A1 | 4/2013 | Carey |
| 2015/0149365 A1 | 5/2015 | Mobini |
| 2016/0027229 A1 | 1/2016 | Spanos |
| 2016/0086175 A1 | 3/2016 | Finlow-Bates |
| 2016/0261411 A1 | 9/2016 | Yau |
| 2016/0275461 A1 | 9/2016 | Sprague |
| 2017/0147808 A1 | 5/2017 | Kravitz |
| 2017/0155513 A1 | 6/2017 | Acar |
| 2017/0180128 A1 | 6/2017 | Lu |
| 2017/0222815 A1 | 8/2017 | Meriac |
| 2017/0344988 A1 | 11/2017 | Cusden |
| 2017/0357966 A1 | 12/2017 | Chandrasekhar |
| 2018/0006826 A1 | 1/2018 | Smith |
| 2018/0276666 A1 | 9/2018 | Haldenby |
| 2018/0288033 A1 | 10/2018 | Kamal |
| 2019/0197815 A1 | 6/2019 | Kamal |
| 2019/0222422 A1 | 7/2019 | Purves |
| 2019/0266334 A1 | 8/2019 | Robison |

OTHER PUBLICATIONS

Biryukov et al., "Argon2: new generation of memory-hard functions for password hashing and other applications", 2016, IEEE, pp. 292-300 (Year: 2016).

SYSTEM AND METHOD FOR BLOCKCHAIN-BASED DEVICE AUTHENTICATION BASED ON A CRYPTOGRAPHIC CHALLENGE

CROSS REFERENCE TO OTHER APPLICATIONS

This application is a continuation of U.S. patent application Ser. No. 16/879,606 entitled SYSTEM AND METHOD FOR BLOCKCHAIN-BASED DEVICE AUTHENTICATION BASED ON A CRYPTOGRAPHIC CHALLENGE filed May 20, 2020 which is incorporated herein by reference for all purposes, which is a continuation of U.S. patent application Ser. No. 15/973,479, entitled SYSTEM AND METHOD FOR BLOCKCHAIN-BASED DEVICE AUTHENTICATION BASED ON A CRYPTOGRAPHIC CHALLENGE filed May 7, 2018, now U.S. Pat. No. 10,715,312 which is incorporated herein by reference for all purposes, which is a continuation in part of U.S. patent application Ser. No. 15/662,417, now U.S. Pat. No. 10,637,665, entitled BLOCKCHAIN-BASED DIGITAL IDENTITY MANAGEMENT (DIM) SYSTEM filed Jul. 28, 2017 which is incorporated herein by reference for all purposes. U.S. patent application Ser. No. 15/662,417 claims priority to U.S. Provisional Application No. 62/368,875, entitled TRUSTED KEY BLOCKCHAIN-BASED IDENTITY MANAGEMENT SYSTEM TOWARDS A WORLD OF STRONG IDENTITY, SECURITY AND SMART CONTRACTS filed Jul. 29, 2016 which is incorporated herein by reference for all purposes, and claims priority to U.S. Provisional Patent Application No. 62/489,772, entitled BLOCKCHAIN-BASED CREDENTIAL AND TOKEN MANAGEMENT IN THE TRUSTED KEY IDENTITY SYSTEM filed on Apr. 25, 2017 which is incorporated herein by reference for all purposes. U.S. patent application Ser. No. 15/973,479 is a continuation in part of U.S. patent application Ser. No. 15/961,791, entitled BLOCKCHAIN-BASED SECURE CREDENTIAL AND TOKEN MANAGEMENT ACROSS MULTIPLE DEVICES filed Apr. 24, 2018 which is incorporated herein by reference for all purposes, which is a continuation in part of U.S. patent application Ser. No. 15/662,417, now U.S. Pat. No. 10,637,665, entitled BLOCKCHAIN-BASED DIGITAL IDENTITY MANAGEMENT (DIM) SYSTEM filed Jul. 28, 2017, which is incorporated herein by reference for all purposes, which claims priority to U.S. Provisional Application No. 62/368,875, entitled TRUSTED KEY BLOCKCHAIN-BASED IDENTITY MANAGEMENT SYSTEM TOWARDS A WORLD OF STRONG IDENTITY, SECURITY AND SMART CONTRACTS filed Jul. 29, 2016, which is incorporated herein by reference for all purposes, and U.S. Provisional Application No. 62/489,772, entitled BLOCKCHAIN-BASED CREDENTIAL AND TOKEN MANAGEMENT IN THE TRUSTED KEY IDENTITY SYSTEM filed on Apr. 25, 2017 which is incorporated herein by reference for all purposes. U.S. patent application Ser. No. 15/961,791 also claims priority to U.S. Provisional Patent Application No. 62/489,772 entitled BLOCKCHAIN-BASED CREDENTIAL AND TOKEN MANAGEMENT IN THE TRUSTED KEY IDENTITY SYSTEM filed Apr. 25, 2017 which is incorporated herein by reference for all purposes. U.S. patent application Ser. No. 15/973,479 also claims priority to U.S. Provisional Patent Application No. 62/503,107 entitled ADDITIONAL SCENARIOS IN AN IDENTITY SYSTEM filed May 8, 2017 which is incorporated herein by reference for all purposes.

BACKGROUND OF THE INVENTION

Today, there are an increasing number of intelligent devices that are connected to the internet in addition to smart phones, tablet computers and personal computers. The intelligent devices include smart voice-based assistants (e.g. Amazon® Echo), smart thermostats (e.g. Nest®), smart door-locks (e.g. Ring), smart self-driven cars, etc. Each of these devices has new capabilities/functionalities, however they also create new security problems as well, for example, how a user can indicate that he/she trust one or more of these devices, such that, they can collaborate to perform actions on behalf of the user.

Accordingly, there remains a need for a secure system and method to authenticate one or more devices to perform actions on behalf of a user.

SUMMARY

In view of foregoing, an embodiment herein provides a processor implemented method for blockchain-based authentication by a user device to enable a second device to perform an action on a first device on behalf of a user linked to the user device, based on a command received from the second device. The method includes the steps of obtaining an identify information associated with an identity document of the user. The identity information uniquely identifies the user. The method further includes the steps of storing the identity information, and a set of credentials, with a blockchain to link the identity information with the set of credentials for the user. The set of credentials include a blockchain-compatible public-private key pair associated with the user that is created using a hardware-based cryptographic processor on the user device. The blockchain-compatible public-private key pair includes a user public key and a user private key. The method further includes the steps of signing a first trust certificate on the blockchain, by the user private key, to obtain a first signed trust certificate. In one embodiment, signing the first trust certificate by the user private key indicates that the user device trusts the first device. The first trust certificate includes a public key of the first device which is associated with the user public key of the user device. The method further includes the steps of signing a second trust certificate on the blockchain, by the user private key, to obtain a second signed trust certificate. In one embodiment, signing the second trust certificate by the user private key indicates that the user device trusts the second device. The second trust certificate includes a public key of the second device which is associated with the user public key of the user device. In another embodiment, when the first device receives the command from the second device, the first device receives the second trust certificate from the second device. The first device communicates a cryptographic challenge using the public key of the second device, to the second device. The second device transmits a response to the cryptographic challenge to the first device. The first device checks, using the public key of the second device, whether the response matches with a predetermined correct response or not. The first device authenticates the second device and executes the command received from the second device only if the response matches with the predetermined correct response.

In one embodiment, the user public key is published and the user private key is protected by at least one of the user's password, biometric or PIN code. In another embodiment, the user private key cannot be extracted out of the hardware-based cryptographic processor by any of a device or operating system (OS) manufacturer, the user, or a party that manages an open identity network.

The cryptographic challenge includes an original random value. The first device communicates the original random value to the second device. The second device encrypts the original random value with the private key of the second device to obtain an encrypted random value and communicates the encrypted random value back to the first device. The first device decrypts the encrypted random value with the public key of the second device and verifies that the decrypted random value is the same as the original random value to prove that that the second device possesses the corresponding private key.

In another aspect, a processor implemented method for blockchain-based authentication by a first device to enable a second device to perform an action on the first device on behalf of a user linked to a user device, based on a command received from the second device is provided. The method includes the step of: (i) receiving a second trust certificate from the second device when the first device receives the command from the second device. The second trust certificate is signed by a user private key associated with the user on a blockchain to obtain a second signed trust certificate. In one embodiment, signing the second trust certificate by the user private key associated with the user indicates that the user device trusts the second device. The second trust certificate includes a public key of the second device which is associated with a user public key of the user device. The method further includes the step of; (ii) communicating a cryptographic challenge using the public key of the second device, to the second device; (iii) receiving a response to the cryptographic challenge from the second device; (iv) checking, using the public key of the second device, whether the response matches with a predetermined correct response or not; and (v) authenticating the second device and executing the command received from the second device only if the response matches with the predetermined correct response.

In one embodiment, the user device obtains an identify information associated with an identity document of the user. The identity information uniquely identifies the user. In another embodiment, a first trust certificate is signed by the user private key on the blockchain to obtain a first signed trust certificate. In yet another embodiment, signing the first trust certificate by the user private key indicates that the user device trusts the first device. The first trust certificate includes a public key of the first device which is associated with the user public key of the user device. The user device stores the identity information, and a set of credentials, with the blockchain to link the identity information with the set of credentials for the user. The set of credentials include a blockchain-compatible public-private key pair associated with the user that is created using a hardware-based cryptographic processor on the user device. The blockchain-compatible public-private key pair includes the user public key and the user private key.

In another aspect, a system for blockchain-based authentication by a user device to enable a second device to perform an action on a first device on behalf of a user linked to the user device, based on a command received from the second device is provided. The system includes a user device processor and a non-transitory computer readable storage medium. The non-transitory computer readable storage medium includes one or more modules executable by the user device processor. The one or more modules includes an identity information registration module, a first trust certificate signing module and a second trust certificate signing module. The identity information registration module obtains an identify information associated with an identity document of the user. The identity information uniquely identifies the user. The identity information registration module stores the identity information, and a set of credentials, with a blockchain to link the identity information with the set of credentials for the user. The set of credentials include a blockchain-compatible public-private key pair associated with the user that is created using a hardware-based cryptographic processor on the user device. The blockchain-compatible public-private key pair includes a user public key and a user private key.

The first trust certificate signing module signs a first trust certificate on the blockchain, by the user private key, to obtain a first signed trust certificate. In one embodiment, signing the first trust certificate by the user private key indicates that the user device trusts the first device. The first trust certificate includes a public key of the first device which is associated with the user public key of the user device.

The second trust certificate signing module signs a second trust certificate on the blockchain, by the user private key, to obtain a second signed trust certificate. In one embodiment, signing the second trust certificate by the user private key indicates that the user device trusts the second device. The second trust certificate includes a public key of the second device which is associated with the user public key of the user device. In another embodiment, when the first device receives the command from the second device, the first device receives the second trust certificate from the second device. The first device communicates a cryptographic challenge using the public key of the second device, to the second device. The second device transmits a response to the cryptographic challenge to the first device. The first device checks, using the public key of the second device, whether the response matches with a predetermined correct response or not. The first device authenticates the second device and executes the command received from the second device only if the response matches with the predetermined correct response.

In one embodiment, the user public key is published and the user private key is protected by at least one of the user's password, biometric or PIN code. In another embodiment, the user private key cannot be extracted out of the hardware-based cryptographic processor by any of a device or operating system (OS) manufacturer, the user, or a party that manages an open identity network.

The cryptographic challenge includes an original random value. The first device communicates the original random value to the second device. The second device encrypts the original random value with the private key of the second device to obtain an encrypted random value and communicates the encrypted random value back to the first device. The first device decrypts the encrypted random value with the public key of the second device and verifies that the decrypted random value is the same as the original random value to prove that that the second device possesses the corresponding private key.

In yet another aspect, a system for blockchain-based authentication by a first device to enable a second device to perform an action on the first device on behalf of a user linked to a user device, based on a command received from the second device is provided. The system includes a first device processor and a non-transitory computer readable storage medium. The non-transitory computer readable storage includes one or more modules executable by the first device processor. The one or more modules includes a trust certificate module, a cryptographic challenge module, a response comparison module and a device authentication module. The trust certificate module receives a second trust certificate from the second device when the first device receives the command from the second device. The second trust certificate is signed by a user private key associated with the user on a blockchain to obtain a second signed trust certificate. In one embodiment, signing the second trust certificate by the user private key associated with the user indicates that the user device trusts the second device. The second trust certificate includes a public key of the second device which is associated with a user public key of the user device.

The cryptographic challenge module communicates a cryptographic challenge using the public key of the second device, to the second device. The cryptographic challenge module receives a response to the cryptographic challenge from the second device. The response comparison module checks, using the public key of the second device, whether the response matches with a predetermined correct response or not. The device authentication module authenticates the second device and executes the command received from the second device only if the response matches with the predetermined correct response.

In one embodiment, the user device obtains an identify information associated with an identity document of the user. The identity information uniquely identifies the user. In another embodiment, a first trust certificate is signed by the user private key on the blockchain to obtain a first signed trust certificate. In yet another embodiment, signing the first trust certificate by the user private key indicates that the user device trusts the first device. The first trust certificate includes a public key of the first device which is associated with the user public key of the user device. The user device stores the identity information, and a set of credentials, with the blockchain to link the identity information with the set of credentials for the user. The set of credentials include a blockchain-compatible public-private key pair associated with the user that is created using a hardware-based cryptographic processor on the user device. The blockchain-compatible public-private key pair includes the user public key and the user private key.

In yet another aspect, one or more non-transitory computer readable storage mediums storing one or more sequences of instructions, which when executed by one or more processors, causes a processor implemented method for blockchain-based authentication by a user device to enable a second device to perform an action on a first device on behalf of a user linked to the user device, based on a command received from the second device is provided. The method includes the steps of obtaining an identify information associated with an identity document of the user. The identity information uniquely identifies the user. The method further includes the steps of storing the identity information, and a set of credentials, with a blockchain to link the identity information with the set of credentials for the user. The set of credentials include a blockchain-compatible public-private key pair associated with the user that is created using a hardware-based cryptographic processor on the user device. The blockchain-compatible public-private key pair includes a user public key and a user private key. The method further includes the steps of signing a first trust certificate on the blockchain, by the user private key, to obtain a first signed trust certificate. In one embodiment, signing the first trust certificate by the user private key indicates that the user device trusts the first device. The first trust certificate includes a public key of the first device which is associated with the user public key of the user device. The method further includes the steps of signing a second trust certificate on the blockchain, by the user private key, to obtain a second signed trust certificate.

In one embodiment, signing the second trust certificate by the user private key indicates that the user device trusts the second device. The second trust certificate includes a public key of the second device which is associated with the user public key of the user device. In another embodiment, when the first device receives the command from the second device, the first device receives the second trust certificate from the second device. The first device communicates a cryptographic challenge using the public key of the second device, to the second device. The second device transmits a response to the cryptographic challenge to the first device. The first device checks, using the public key of the second device, whether the response matches with a predetermined correct response or not. The first device authenticates the second device and executes the command received from the second device only if the response matches with the predetermined correct response.

In one embodiment, the user public key is published and the user private key is protected by at least one of the user's password, biometric or PIN code. In another embodiment, the user private key cannot be extracted out of the hardware-based cryptographic processor by any of a device or operating system (OS) manufacturer, the user, or a party that manages an open identity network.

The cryptographic challenge includes an original random value. The first device communicates the original random value to the second device. The second device encrypts the original random value with the private key of the second device to obtain an encrypted random value and communicates the encrypted random value back to the first device. The first device decrypts the encrypted random value with the public key of the second device and verifies that the decrypted random value is the same as the original random value to prove that that the second device possesses the corresponding private key.

In another aspect, one or more non-transitory computer readable storage mediums storing one or more sequences of instructions, which when executed by one or more processors, causes a processor implemented method for blockchain-based authentication by a first device to enable a second device to perform an action on the first device on behalf of a user linked to a user device, based on a command received from the second device is provided. The method includes the step of: (i) receiving a second trust certificate from the second device when the first device receives the command from the second device. The second trust certificate is signed by a user private key associated with the user on a blockchain to obtain a second signed trust certificate. In one embodiment, signing the second trust certificate by the user private key associated with the user indicates that the user device trusts the second device. The second trust certificate includes a public key of the second device which is associated with a user public key of the user device. The method further includes the step of (ii) communicating a cryptographic challenge using the public key of the second device, to the second device; (iii) receiving a response to the cryptographic challenge from the second device; (iv) checking, using the public key of the second device, whether the response matches with a predetermined correct response or not; and (v) authenticating the second device and executing the command received from the second device only if the response matches with the predetermined correct response.

In one embodiment, the user device obtains an identify information associated with an identity document of the user. The identity information uniquely identifies the user. In another embodiment, a first trust certificate is signed by the user private key on the blockchain to obtain a first signed trust certificate. In yet another embodiment, signing the first trust certificate by the user private key indicates that the user device trusts the first device. The first trust certificate includes a public key of the first device which is associated with the user public key of the user device. In yet another embodiment, the user device stores the identity information, and a set of credentials, with the blockchain to link the identity information with the set of credentials for the user. The set of credentials include a blockchain-compatible public-private key pair associated with the user that is created using a hardware-based cryptographic processor on the user device. The blockchain-compatible public-private key pair includes the user public key and the user private key.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

Various embodiments of the invention are disclosed in the following detailed description and the accompanying drawings.

The embodiments herein will be better understood from the following detailed description with reference to the drawings, in which.

DETAILED DESCRIPTION

Figure 1:
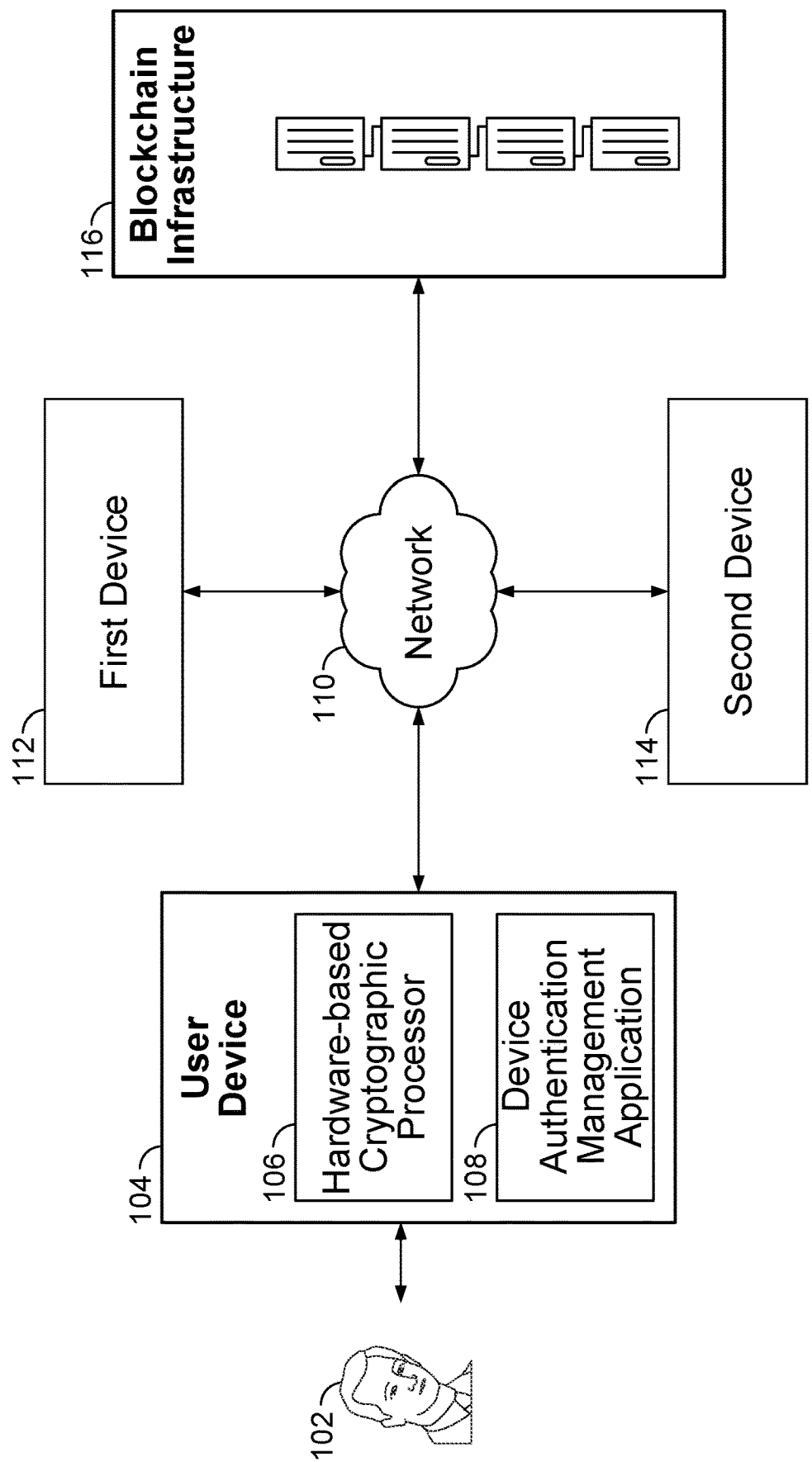
FIG. 1 is a block diagram of a system for blockchain-based device authentication by a user device to enable a second device to perform an action on a first device on behalf of a user linked to the user device according to an embodiment herein.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided to below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

There is a need for a system and method of device authentication management to authenticate one or more devices. Referring now to the drawings, and more particularly to FIGS. 1 through 6, where similar reference characters denote corresponding features consistently throughout the figures, preferred embodiments are shown.

FIG. 1 illustrates is a block diagram of a system for blockchain-based device authentication by a user device 104 to enable a second device 114 to perform an action on a first device 112 on behalf of a user 102 linked to the user device 104 according to an embodiment herein. The system includes the user device 104, a network 110, the first device 112, the second device 114, and a blockchain infrastructure 116. The user device 104 includes a hardware based cryptographic processor 106 and a device authentication management application 108. The user device 104 also includes a user device processor (not shown in FIG.). The user 102 may self-provision his/her identify credentials by downloading and initializing the device authentication management application 108 on the user device 104. The blockchain infrastructure 116 serves as a registry of the credentials. The hardware based cryptographic processor 106 (e.g. a Secure Enclave processor, ARM Trustzone) creates a set of credentials including a blockchain-compatible public-private key pair associated with the user 102.

The hardware based cryptographic processor 106 is a computer on a chip (e.g. system-on-a-chip) or microprocessor that is dedicated for carrying out cryptographic operations. It is embedded in a packaging with multiple physical security measures, which give it a degree of tamper resistance. In some embodiments, the hardware based cryptographic processor 106 may not output decrypted data or decrypted program instructions in an environment where security cannot be maintained. The hardware based cryptographic processor 106 also segregates the cryptographic operations from the device processor and thus improves speed and efficiency and improves battery life. For example, iOS® devices may include an advanced encryption standard (AES) 256 crypto engine that is built into a direct memory access (DMA) path between a flash storage and main system memory. The Snapdragon 820 processor that is used by certain android devices also includes a crypto engine.

The credentials (e.g. a blockchain-compatible public-private key pair) includes a user public key and a user private key. In one embodiment, the user public key is published and the user private key is protected by at least one of the user's 102 password, biometric or PIN code. In another embodiment, the user private key cannot ordinarily be extracted out of the hardware-based cryptographic processor 106 by any of a device or operating system (OS) manufacturer, the user 102, or a party that manages an open identity network. The user device 104 may be but it is not limited to a laptop, a mobile phone, a tablet or a personal computer.

Figure 2:
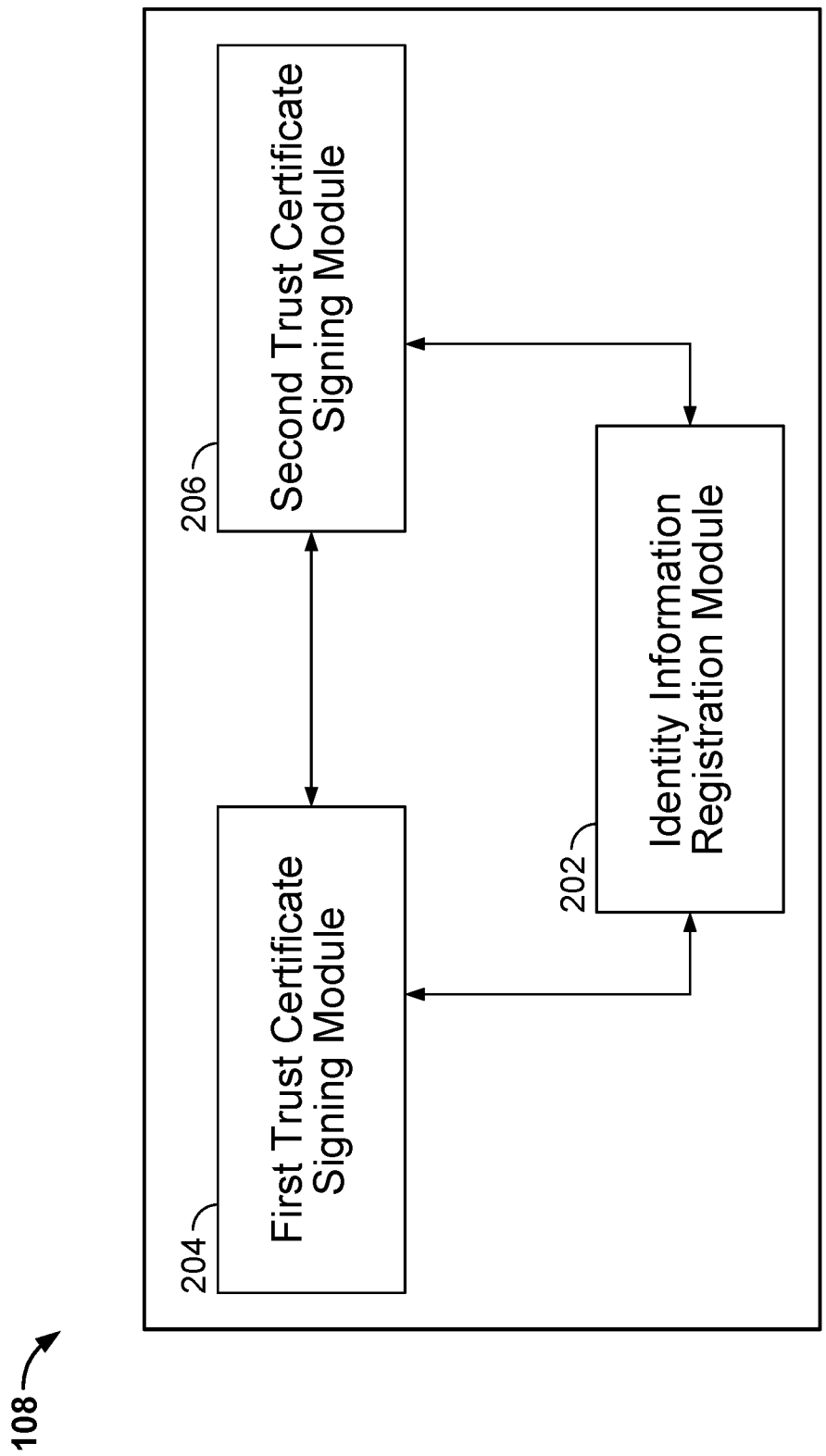
FIG. 2 is a block diagram of a device authentication management application in the user device of FIG. 1 according to an embodiment herein.

FIG. 2 is a block diagram of the device authentication management application 108 in the user device 104 of FIG. 1 according to an embodiment herein. The device authentication management application 108 includes an identity information registration module 202, a first trust certificate signing module 204, and a second trust certificate signing module 206. The identity information registration module 202 obtains an identify information associated with an identity document of the user 102 via the network 110. The identify information may be but it is not limited to a user name, date of birth (DOB), address, or a unique identification number. The identity document may be but it is not limited to a driving license of the user 102 issued by government. The identity information uniquely identifies the user 102. The identity information registration module 202 stores the identity information, and a set of credentials, with the blockchain 116 to link the identity information with the set of credentials for the user 102. The first trust certificate signing module 204 signs a first trust certificate by the user private key on the blockchain 116 to obtain a first signed trust certificate via the network 110. In one embodiment, signing the first trust certificate by the user private key indicates that the user device 104 trusts the first device 112. The first trust certificate includes a public key of the first device 112 which is associated with the user public key of the user device 104.

The second trust certificate signing module 206 signs a second trust certificate by the user private key on the blockchain 116 to obtain a second signed trust certificate via the network 110. In one embodiment, signing the second trust certificate by the user private key indicates that the user device 104 trusts the second device 114. The second trust certificate includes a public key of the second device 114 which is associated with the user public key of the user device 104. In one embodiment, when the first device 112 receives the command from the second device 114, the first device 112 receives the second trust certificate from the second device 114 via the network 110. The first device 112 communicates a cryptographic challenge using the public key of the second device 114, to the second device 114 via the network 110. The second device 114 transmits a response to the cryptographic challenge to the first device 112 via the network 110. In one embodiment, the first device 112 checks, using the public key of the second device 114, whether the response matches with a predetermined correct response or not. In another embodiment, the first device 112 authenticates the second device 114 and executes the command received from the second device 114 only if the response matches with the predetermined correct response.

Figure 3:
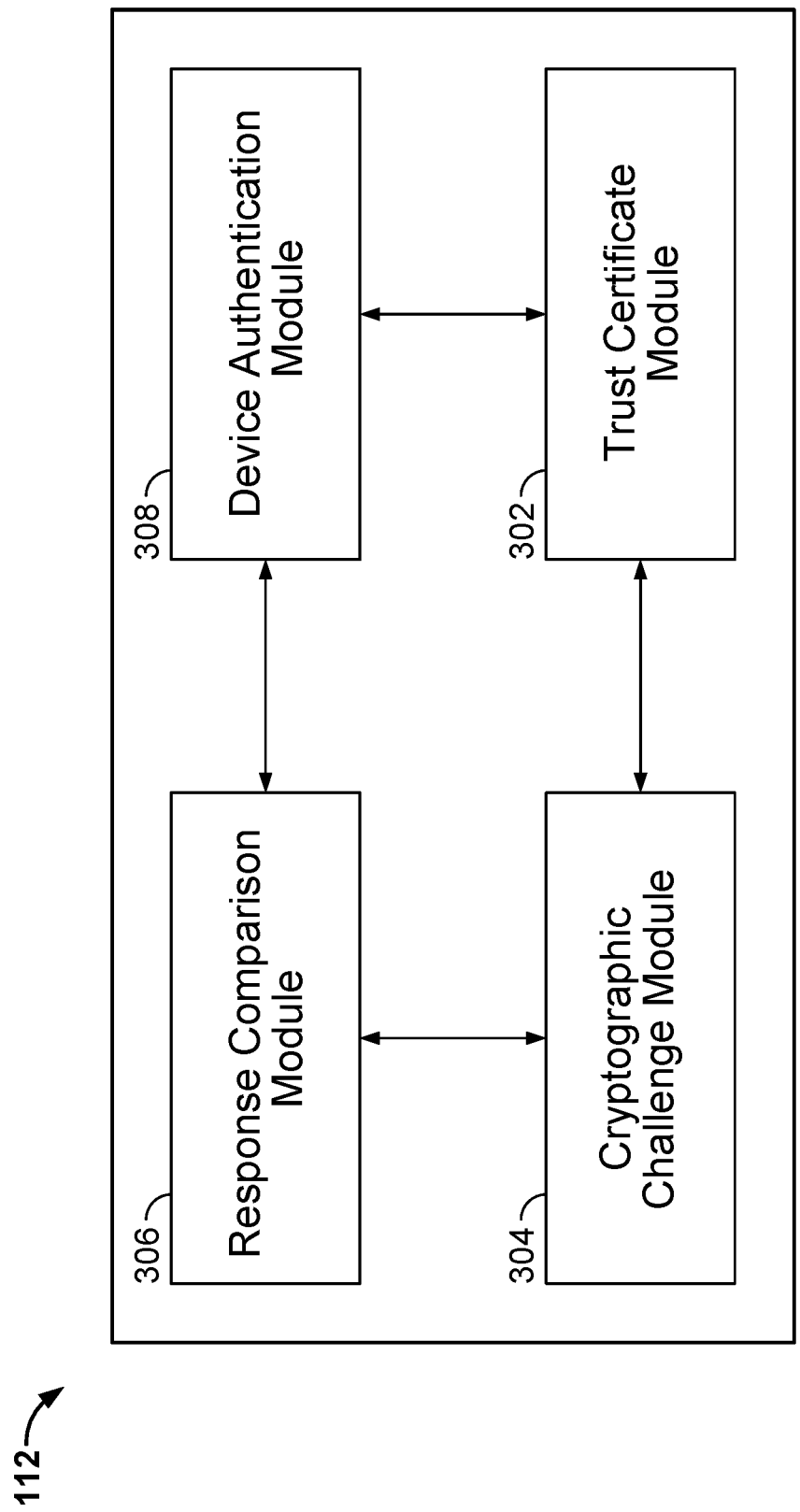
FIG. 3 is a block diagram of the first device of FIG. 1 according to an embodiment herein.

FIG. 3 is a block diagram of the first device 112 of FIG. 1 according to an embodiment herein. The first device 112 includes a trust certificate module 302, a cryptographic challenge module 304, a response comparison module 306, and a device authentication module 308. The trust certificate module 302 receives the second trust certificate from the second device 114 when the first device 112 receives the command from the second device 114 via the network 110. In one embodiment, the second trust certificate is signed by the user private key associated with the user 102 on the blockchain 116 to obtain the second signed trust certificate. In another embodiment, signing the second trust certificate by the user private key associated with the user 102 indicates that the user device 104 trusts the second device 114. The cryptographic challenge module 304 communicates a cryptographic challenge using the public key of the second device 114, to the second device 114 via the network 110. The cryptographic challenge includes an original random value. The first device 112 communicates the original random value to the second device 114 via the network 110. The second device 114 encrypts the original random value with the private key of the second device 114 to obtain an encrypted random value and communicates the encrypted random value back to the first device 112 via the network 110. The first device 112 decrypts the encrypted random value with the public key of the second device 114 and verifies that the decrypted random value is the same as the original random value to prove that that the second device 114 possesses the corresponding private key. The cryptographic challenge module 304 receives a response to the cryptographic challenge from the second device 114. The response comparison module 306 checks, using the public key of the second device 114, whether the response matches with the predetermined correct response or not. The device authentication module 308 authenticates the second device 114 and executes the command received from the second device 114 only if the response matches with the predetermined correct response.

Figure 4:
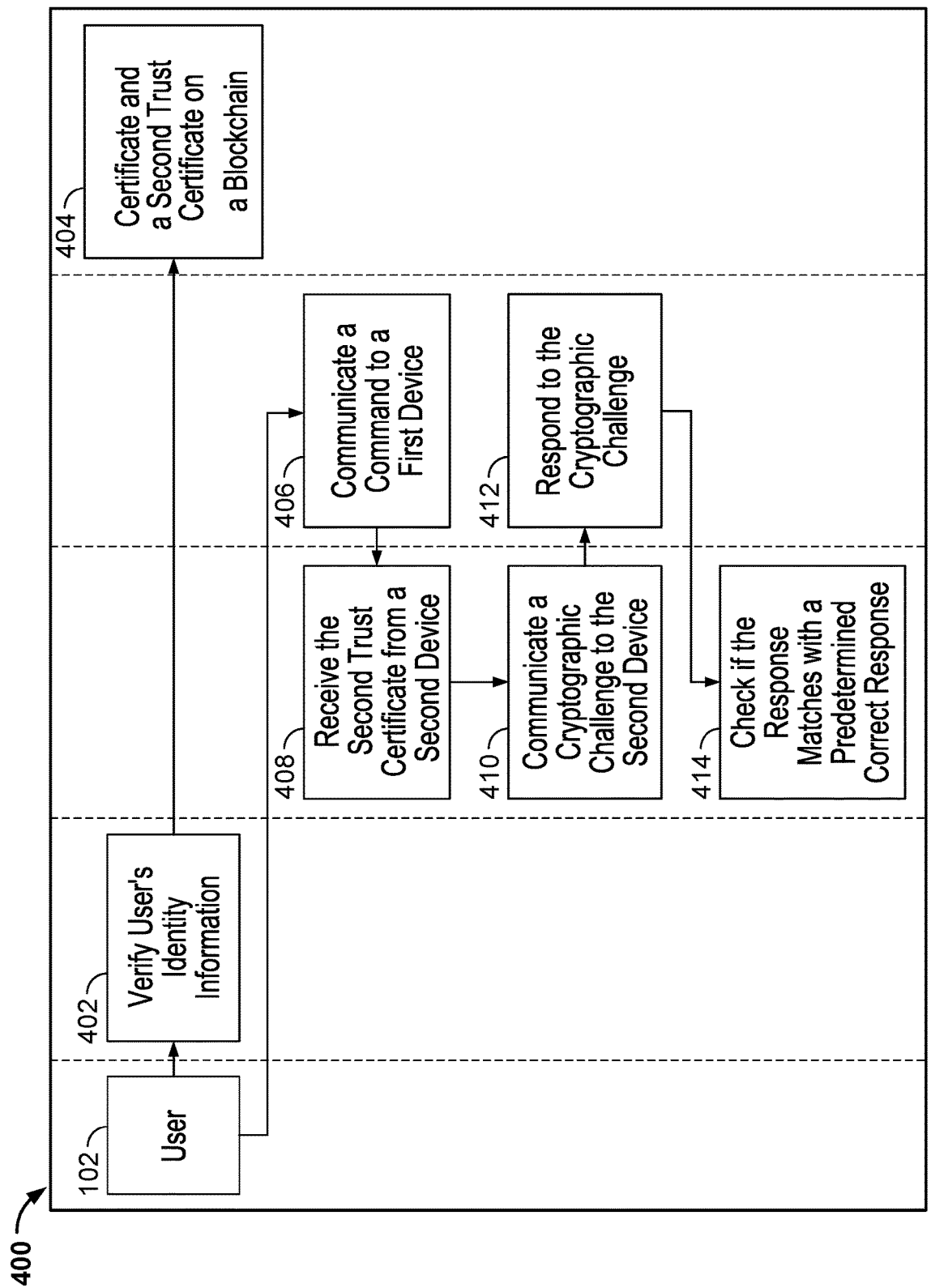
FIG. 4 is a flow chart that illustrates a process of the user having the user device to enable the second device to perform the action on the first device on behalf of the user of FIG. 1 according to an embodiment herein.

FIG. 4 is a flow chart that illustrates a process of the user 102 having the user device 104 to enable the second device 114 to perform the action on the first device 112 on behalf of the user 102 of FIG. 1 according to an embodiment herein. At step 402, the user device 104 verifies the user identity information of the user 102. At step 404, the user device 104 signs the first trust certificate and the second trust certificate using the user private key of the user 102 on the blockchain 116 via the network 110. At step 406, the second device 114 communicates the command to the first device 112 via the network 110. At step 408, the first device 112 receives the second trust certificate from the second device 114 when the first device 112 receives the command from the second device 114 via the network 110. At step 410, the first device 112 communicates a cryptographic challenge to the second device 114 via the network 110. At step 412, the second device 114 transmits a response to the cryptographic challenge to the first device 112 via the network 110. At step 414, the first device 112 checks, using the public key of the second device 114, whether the response matches with the predetermined correct response or not to authenticate the second device 114.

Figure 5:
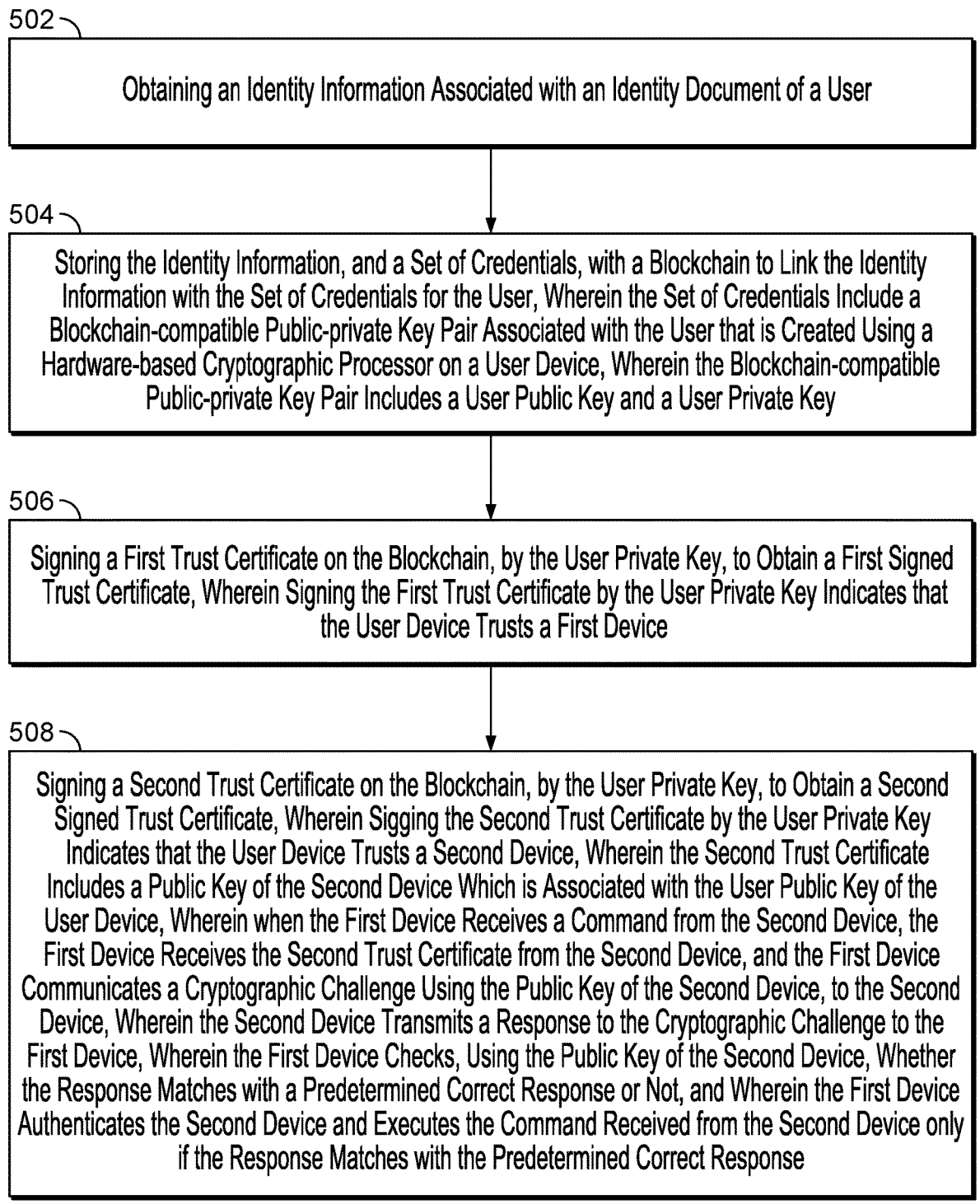
FIG. 5 is a flow chart illustrating a method for blockchain-based device authentication using the user device of FIG. 1 according to an embodiment herein.

FIG. 5 is a flow chart illustrating a method for blockchain-based device authentication using the user device 104 of FIG. 1 according to an embodiment herein. At step 502, the user device 104 obtains the identify information associated with the identity document of the user 102. The identity information uniquely identifies the user 102. At step 504, the user device 104 stores the identity information, and the set of credentials, with the blockchain 116 to link the identity information with the set of credentials for the user 102. At step 506, the user device 104 signs the first trust certificate on the blockchain 116, by the user private key, to obtain the first signed trust certificate via the network 110. In one embodiment, signing the first trust certificate by the user private key indicates that the user device 104 trusts the first device 112. At step 508, the user device 104 signs the second trust certificate on the blockchain 116, by the user private key, to obtain the second signed trust certificate. In one embodiment, signing the second trust certificate by the user private key indicates that the user device 104 trusts the second device 114. In another embodiment, when the first device 112 receives the command from the second device 114, the first device 112 receives the second trust certificate from the second device 114 via the network 110. The first device 112 communicates a cryptographic challenge using the public key of the second device 114, to the second device 114 via the network 110. The second device 114 transmits a response to the cryptographic challenge to the first device 112 via the network 110. The first device 112 checks, using the public key of the second device 114, whether the response matches with the predetermined correct response or not. In one embodiment the first device 112 authenticates the second device 114 and executes the command received from the second device 114 only if the response matches with the predetermined correct response.

Figure 6:
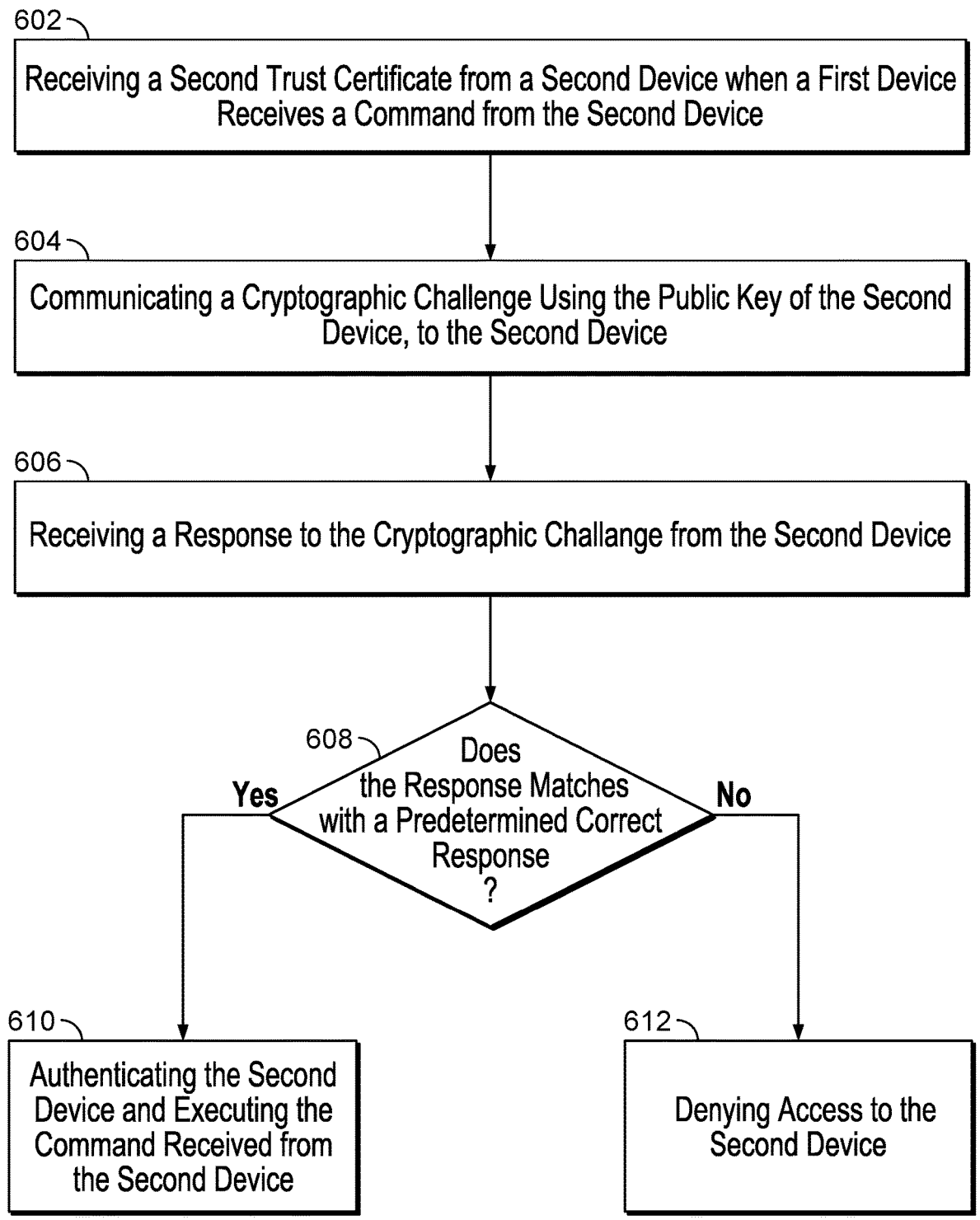
FIG. 6 is a flow chart illustrating a method for blockchain-based device authentication using the first device of FIG. 1 according to an embodiment herein.

FIG. 6 is a flow chart illustrating a method for blockchain-based device authentication using the first device 112 of FIG. 1 according to an embodiment herein. At step 602, the first device 112 receives the second trust certificate from the second device 114 when the first device 112 receives the command from the second device 114 via the network 110. The second trust certificate is signed by the user private key associated with the user 102 on the blockchain 116 to obtain the second signed trust certificate via the network 110. In one embodiment, signing the second trust certificate by the user private key associated with the user 102 indicates that the user device 104 trusts the second device 114. At step 604, the first device 112 communicates a cryptographic challenge using the public key of the second device 114, to the second device 114 via the network 110. At step 606, the first device 112 receives a response to the cryptographic challenge from the second device 114 via the network 110. At step 608, the first device 112 checks, using the public key of the second device 114, whether the response matches with a predetermined correct response. If yes, the first device 112 authenticates the second device 114 and executes the command received from the second device 114 only if the response matches with the predetermined correct response at step 610. Else, the first device 112 denies access to the second device 114 at step 612.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A processor implemented method for blockchain-based authentication, the method comprising:
    receiving, by a first device, a command on behalf of a user linked to a user device to perform an action from a second device, wherein:
        a blockchain includes identity information associated with the user;
        the identity information uniquely identifies the user;
        a set of credentials include a blockchain-compatible public-private key pair associated with the user that is created using a hardware-based cryptographic processor on the user device;
        the blockchain-compatible public-private key pair associated with the user includes a user private key and a user public key;
        the user device stores the identity information and the set of credentials on the blockchain to link the identity information and the set of credentials for the user; and
        the first device is associated with a first trust certificate signed by the user device based on a user private key associated with the user on a blockchain, wherein the first trust certificate indicates that the user device trusts the first device to perform the action on behalf of the user;
        the second device is associated with a second trust certificate signed by the user device based on the user private key associated with the user on the blockchain; and
    receiving the second trust certificate from the second device, wherein the second trust certificate comprises a public key of the second device which is associated with a user public key of the user device; and
    in response to receiving the command and the second trust certificate:
        communicating a cryptographic challenge using the public key of the second device to the second device;
        receiving a response to the cryptographic challenge from the second device;
        checking, using the public key of the second device, whether the response matches with a predetermined correct response or not; and
        authenticating the second device and executing the command received from the second device in response to the response matching with the predetermined correct response.

2. The method of claim 1, wherein the identity information comprises one or more of: a user's password, a biometric, and/or a PIN code.

3. The method of claim 1, wherein the user private key cannot be extracted out of the hardware-based cryptographic processor by one or more of: a device manufacturer, an operating system manufacturer, a user, and/or a manager of an open identity network.

4. The method of claim 1, wherein the cryptographic challenge comprises a random value.

5. The method of claim 1, wherein the response to the cryptographic challenge from the second device comprises the cryptographic challenge encrypted with a private key of the second device.

6. The method of claim 1, wherein the response to the cryptographic challenge from the second device comprises the cryptographic challenge encrypted with a private key of the second device.

7. The method of claim 1, wherein the predetermined correct response comprises the cryptographic challenge.

8. A system for blockchain-based authentication, the system comprising:
   an interface configured to:
   receive, by a first device, a command on behalf of a user linked to a user device to perform an action from a second device, wherein:
     a blockchain includes identity information associated with the user;
     the identity information uniquely identifies the user;
     a set of credentials include a blockchain-compatible public-private key pair associated with the user that is created using a hardware-based cryptographic processor on the user device;
     the blockchain-compatible public-private key pair associated with the user includes a user private key and a user public key;
     the user device stores the identity information and the set of credentials on the blockchain to link the identity information and the set of credentials for the user; and
     the first device is associated with a first trust certificate signed by the user device based on a user private key associated with the user on a blockchain, wherein the first trust certificate indicates that the user device trusts the first device to perform the action on behalf of the user;
     the second device is associated with a second trust certificate signed by the user device based on the user private key associated with the user on the blockchain; and
   receive the second trust certificate from the second device, wherein the second trust certificate comprises a public key of the second device which is associated with a user public key of the user device; and
   a processor configured to:
     in response to receiving the command and the second trust certificate:
       communicate a cryptographic challenge using the public key of the second device to the second device;
       receive a response to the cryptographic challenge from the second device;
       check, using the public key of the second device, whether the response matches with a predetermined correct response or not; and
       authenticate the second device and execute the command received from the second device in response to the response matching with the predetermined correct response.

9. The system of claim 8, wherein the identity information comprises one or more of: a user's password, a biometric, and/or a PIN code.

10. The system of claim 8, wherein the user private key cannot be extracted out of the hardware-based cryptographic processor by one or more of: a device manufacturer, an operating system manufacturer, a user, and/or a manager of an open identity network.

11. The system of claim 8, wherein the cryptographic challenge comprises a random value.

12. The system of claim 8, wherein the response to the cryptographic challenge from the second device comprises the cryptographic challenge encrypted with a private key of the second device.

13. The system of claim 8, wherein the response to the cryptographic challenge from the second device comprises the cryptographic challenge encrypted with a private key of the second device.

14. The system of claim 8, wherein the predetermined correct response comprises the cryptographic challenge.

15. A non-transitory computer program product for blockchain-based authentication, the non-transitory computer program product being embodied in a non-transitory computer readable storage medium and comprising computer instructions for:
   receiving, by a first device, a command on behalf of a user linked to a user device to perform an action from a second device, wherein:
     a blockchain includes identity information associated with the user;
     the identity information uniquely identifies the user;
     a set of credentials include a blockchain-compatible public-private key pair associated with the user that is created using a hardware-based cryptographic processor on the user device;
     the blockchain-compatible public-private key pair associated with the user includes a user private key and a user public key;
     the user device stores the identity information and the set of credentials on the blockchain to link the identity information and the set of credentials for the user; and
     the first device is associated with a first trust certificate signed by the user device based on a user private key associated with the user on a blockchain, wherein the first trust certificate indicates that the user device trusts the first device to perform the action on behalf of the user;
     the second device is associated with a second trust certificate signed by the user device based on the user private key associated with the user on the blockchain; and
   receiving the second trust certificate from the second device, wherein the second trust certificate comprises a public key of the second device which is associated with a user public key of the user device; and
   in response to receiving the command and the second trust certificate:
     communicating a cryptographic challenge using the public key of the second device to the second device;
     receiving a response to the cryptographic challenge from the second device;
     checking, using the public key of the second device, whether the response matches with a predetermined correct response or not; and
     authenticating the second device and executing the command received from the second device in response to the response matching with the predetermined correct response.

\* \* \* \* \*

UNITED STATES PATENT AND TRADEMARK OFFICE
CERTIFICATE OF CORRECTION

PATENT NO. : 11,632,239 B2
APPLICATION NO. : 17/719190
DATED : April 18, 2023
INVENTOR(S) : Prakash Sundaresan, Lionello G. Lunesu and Antoine Cote It is certified that error appears in the above-identified patent and that said Letters Patent is hereby corrected as shown below:

In the Specification

In Column 8, Line(s) 12, after "provided", delete "to".

Signed and Sealed this
First Day of August, 2023

*Katherine Kelly Vidal*

Katherine Kelly Vidal
*Director of the United States Patent and Trademark Office*